United States Patent [19]
Moretti et al.

[11] Patent Number: 6,098,178
[45] Date of Patent: Aug. 1, 2000

[54] TIME SYNCHRONIZATION ALGORITHM FOR MASSIVELY PARALLEL PROCESSOR SYSTEMS

[75] Inventors: David J. Moretti, Wakefield; John A. Fitzgerald, Bristol, both of R.I.

[73] Assignee: The United States of America as represented by the Secretary of the Navy, Washington, D.C.

[21] Appl. No.: 09/090,224

[22] Filed: May 22, 1998

[51] Int. Cl.[7] .................................................. G06F 1/04
[52] U.S. Cl. ........................................ 713/500; 713/502
[58] Field of Search .................................. 713/400, 500, 713/502, 600

[56] References Cited

U.S. PATENT DOCUMENTS

| | | | |
|---|---|---|---|
| 4,503,490 | 3/1985 | Thompson | 709/400 |
| 4,589,093 | 5/1986 | Ippolito et al. | 709/102 |
| 4,803,708 | 2/1989 | Momose | 377/28 |
| 4,882,739 | 11/1989 | Potash et al. | 375/358 |
| 5,440,721 | 8/1995 | Morgan et al. | 395/550 |
| 5,471,631 | 11/1995 | Beardsley et al. | 713/502 |
| 5,504,878 | 4/1996 | Coscarella et al. | 395/550 |
| 5,530,846 | 6/1996 | Strong | 713/400 |

*Primary Examiner*—Dennis M. Butler
*Attorney, Agent, or Firm*—Michael J. Morgan; Prithvi C. Lall; Michael F. Oglo

[57] ABSTRACT

A time synchronized multi-processor system and a method for determining the absolute time when an event occurs in the system are described. The system has a plurality of processor elements, a system clock for generating a periodic time signal which is received by each of the processor elements, event reports generated by at least one of the processor elements, a system controller for reading the event reports, and a time board for generating an interrupt signal which causes the system controller to read the event report and to determine the absolute time of the event. The method for determining the absolute time when the event occurs in the system comprises the steps of providing a plurality of processor elements, providing a system clock for generating a time signal, detecting an event and providing at least one processor element with a signal representative of the event, generating an event report with the processor(s) and periodically generating a second or interrupt signal using a time board for causing a system controller board to search for any such event report, read the event report, and determine the absolute time of day of any event in the event report.

14 Claims, 2 Drawing Sheets

TIME SYNCHRONIZATION ALGORITHM FOR MASSIVELY PARALLEL PROCESSOR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (a) Field of the Invention

The present invention relates to a time synchronized multi-processor system and a method for synchronizing multiple processor elements in the system to a time source so as to determine the absolute time that events occur in the system.

(b) Description of the Prior Art

Increasingly, large computer systems are being built using many individual processors running in parallel. Time synchronization of these multiple processors is needed.

Timing systems are known in the prior art. For example, U.S. Pat. No. 4,503,490 to Thompson illustrates a timing system for distributing clock signals in a synchronous processing system having plural processing sections. The timing system includes a central clock circuit and a plurality of section clock circuits. Each section clock circuit is located in and associated with a different one of the processing sections. Each section clock circuit is arranged to respond to a system clock signal for stepping through a plurality of states including a state common to the plurality of section clock circuits. An arrangement, responsive to the system clock signal, produces and transmits to the plurality of section clock circuits a synchronization signal that routinely sets the plurality of section clock circuits to the common state. The timing system further includes an arrangement for controlling suspension of processing in the plural processing sections.

U.S. Pat. No. 4,803,708 to Momose relates to a time of day coincidence system for coinciding time of day values of a plurality of apparatuses. The system includes a clock pulse generator for generating clock pulses having a predetermined interval, a TOD time of day timer controlled by the clock pulse, a time of day correction signal generator for generating a correction signal in a predetermined interval which is a multiple of the count cycle of the TOD timer. The clock pulse generator, the TOD timer, and the correction signal generator are arranged commonly for the apparatuses. The system also includes a counter which is incremented in response to the clock pulse, a time of day read and set unit for reading out current time of day information from the TOD timer in response to an external instruction and setting the time of day information in the counter, and a time of day correction unit for correcting the count of the counter in response to the correction signal. The counter, the time of day read and set unit, and the time of day correction unit are arranged in each of the apparatuses.

U.S. Pat. No. 5,504,878 to Coscarella et al. relates to a system for synchronizing multiple time of day clocks using a central time of day reference. The system includes a central time of day reference source integrated into a switch which interconnects I/O devices and host processors in a computer complex via fiber-optic links. A time reference oscillator in the switch serves to generate reference signals for the central reference and also provides a clock signal for the switch transmissions. Units to which the switch is attached obtain clock signals from their regenerated clocks which are synchronized to the time reference oscillator, and use the regenerated clock signals to control their local time-of-day counters. Each unit periodically transmits a signal to the switch requesting a dynamic connection to the switch-based central time-of-day reference in order to receive a time of day message.

U.S. Pat. No. 5,440,721 to Morgan et al. relates to a method and apparatus for controlling signal timing of cascaded signal processing units. Each of the signal processing units of a digital signal processing system is provided with a programmable timing delay unit having an identical programming interface to control the signal timing of its signal processing circuitry. A central timing unit is provided to the digital signal processing system to provide signal timing control inputs to the programmable timing delay units. A routine switcher is provided to the digital signal processing system to control configuration of the signal path, i.e. the order in which the signal is processed by all or a subset of the signal processing units of the digital signal processing system. The individual signal processing units are relieved from the burden of providing circuitry for timing control, delay equalization and timing derivation. The timing offsets for the individual signal processing units may be easily recomputed for any signal path, improving the reconfiguration flexibility of the digital signal processing system.

In some prior art parallel processor systems, event generated interrupts were relied upon and used to freeze time on a time board. Such algorithms are extremely difficult to implement in a massively parallel architecture.

There remains a need for a system and a method for determining the absolute time that events occur in a multi-processor system.

SUMMARY OF THE INVENTION

Accordingly, it is an object of the present invention to provide an improved method for determining the absolute time when events occur in a multi-processor system.

It is a further object of the present invention to provide an improved multi-processor system having improved means for determining the absolute time when events occur.

It is yet a further object of the present invention to provide a system which provides a stable time even if an external time source takes large jumps in time forward or backwards.

The foregoing objects are attained by the system and the method of the present invention.

The system of the present invention broadly comprises a plurality of processor elements for processing information about events; means for generating a periodic time signal; each of said processor elements receiving said periodic time signal and a first signal that an event has occurred and thereafter generating an event report containing data about said event and information correlating said event to said periodic time signal; means for reading said event report; and means for periodically generating a second signal which causes said reading means to read said event reports and for determining the absolute time of the event.

The method for determining the absolute time when an event occurs in the system having a plurality of processors broadly comprises the steps of providing a plurality of processor elements; providing means for generating a time signal having a desired period; initializing said processor elements and beginning input of said periodic time signal into each of said processor elements after said initializing step; detecting an event and providing at least one processor element with a first signal representative of said event; generating an event report with said at least one processor which contains information about said event and a correlation between said event and said periodic time signal; and periodically generating a second signal using a time board for causing a system controller board to search for any said event report, read said event report if one exists, and determine the absolute time of day of any event in said event report. The method further comprises the system controller board reading the time of day when each second signal is generated from the time board. The absolute time of an event is determined by ascertaining the number of time periods after initialization that the event occurred, subtracting the number of time periods representing the time of the previous second signal and multiplying the difference between the two with the period of the time signal to determine an offset time. The offset time is then added to the time of day of the previous signal to determine the absolute time of the event.

Other details of the system and the method of the present invention are set forth in the following detailed description and the accompanying drawings wherein like reference numerals depict like elements.

DETAILED DESCRIPTION OF THE PREFERRED EMBODIMENT(S)

Figure 1:
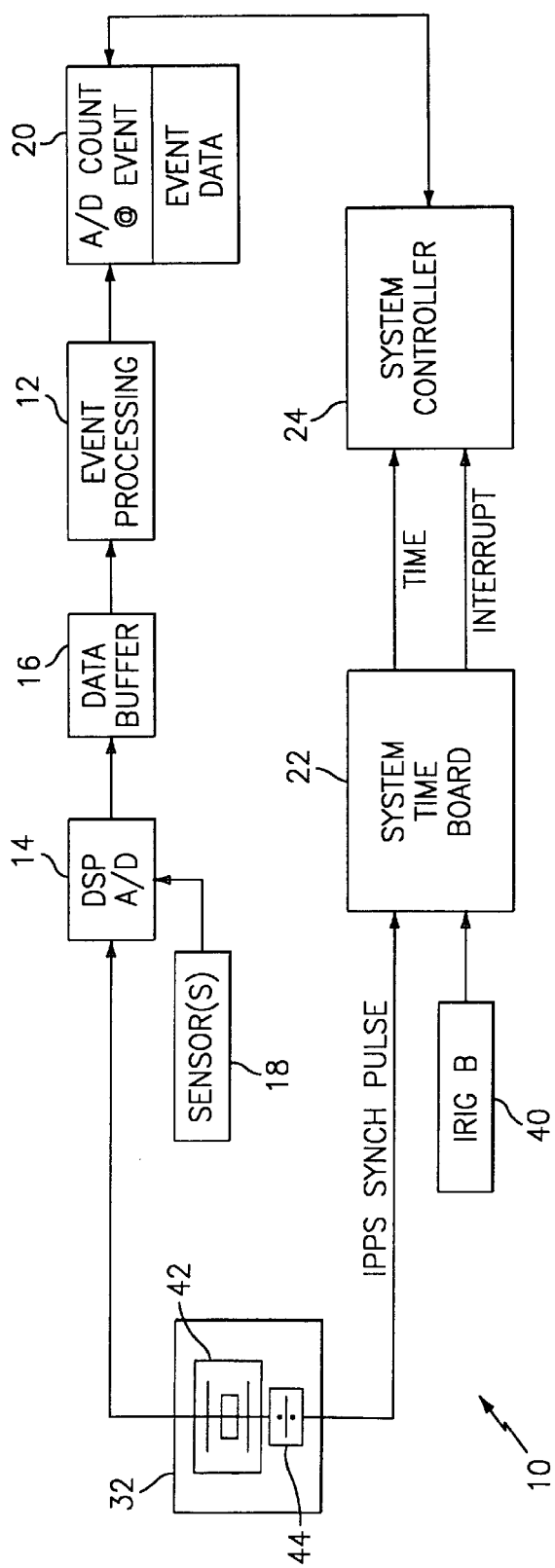
FIG. 1 is a schematic representation of a multi-processor system in accordance with the present invention.
Figure 2:
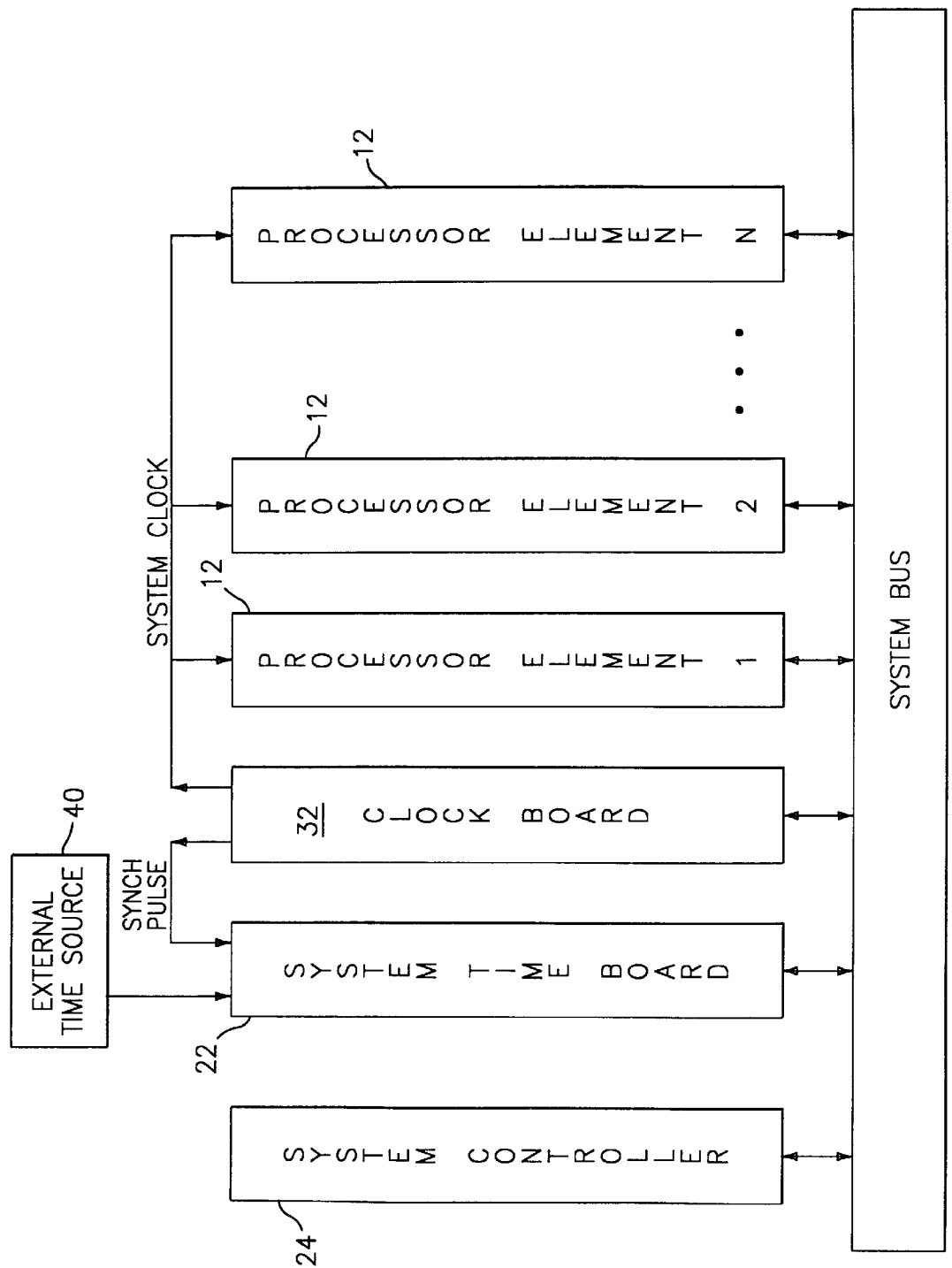
FIG. 2 is a schematic representation of a portion of the system of FIG 1.

Referring now to the drawings, FIGS. 1 and 2 illustrate a system 10 having a plurality of processor elements 12 and means for synchronizing the multiple processing elements 12 to an external time source 40. The processing elements 12 may comprise any suitable computer or processing unit known in the art containing any desired programming for processing received information.

Figure 3:
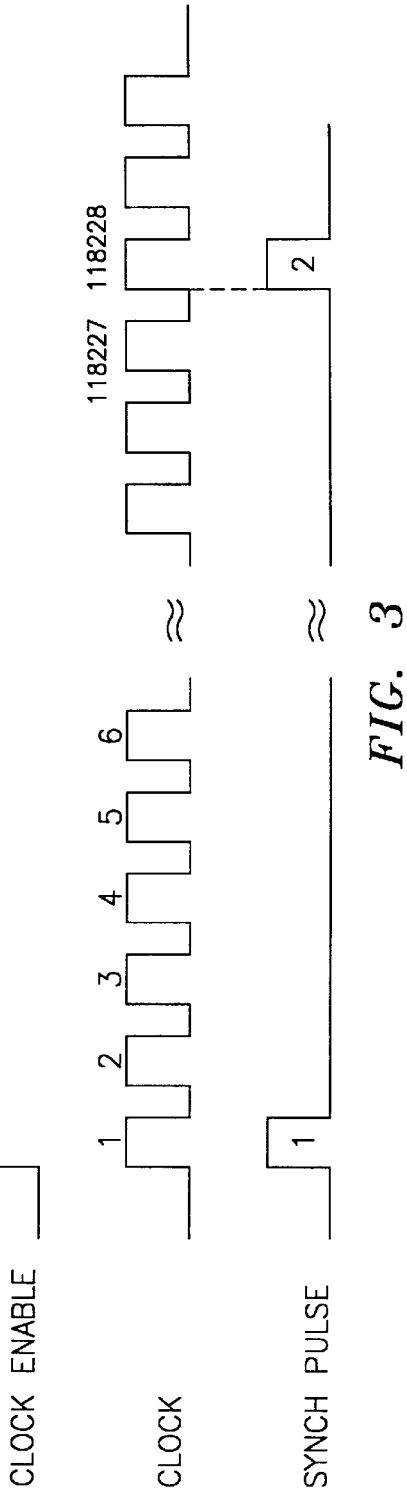
FIG. 3 illustrates the various timing sequences in the system of FIG. 1 when a system clock oscillating at 118227 Hz is used.

As shown in FIGS. 1 and 2, the system 10 includes a system clock 32 for providing a time signal to each processor element 12. The system clock 32 may comprise a circuit board having an oscillator 42 or any other suitable timing device which provides a clock signal with a period and a dividing circuit 44 for generating a pulse signal with a desired period such as a 1 pulse per second synchronous pulse signal. The relationship between the clock signal and the synchronization pulse for a 118227 Hz oscillator is shown in FIG. 3. As shown in FIG. 2, the clock signal is provided to each of the processor elements 12.

Upon system initialization, the system clock 32 is disabled. During this period of disablement, all system processor elements 12 are initialized. Thereafter, the clock 32 is enabled. Each processor element 12 includes a counter (not shown) which is incremented by receipt of the clock signal. As will be discussed hereinafter, processor event times are referenced to this counter.

The system 10 further includes an analog to digital converter 14 connected to each processor element 12 via a data buffer 16. The analog to digital converter receives an analog signal or signals from a sensor or sensors 18, such as a plurality of hydrophones. The sensor(s) 18 detect(s) an event such as the passing of a ship. The signal from the sensor(s) 18 is digitized by the converter 14 and fed into the data buffer 16 for storage and for transmission to one or more of the processor elements 12. The A/D sample rate is derived from the common clock 32. Each processor element 12 processes the signal in accordance with its programming and generates an event report 20 which includes data about the event. As previously mentioned, each processor element 12 includes a counter which keeps track of the number of time periods or counts which have elapsed since initialization. The event report 20 specifies the count number at the time of the event.

As shown in FIGS. 1 and 2, the system includes a system time board 22 and a system controller board 24. The construction of the system time board 22 and the system controller board 24 do not form part of the present invention. Thus, the system time board 22 and the system controller board 24 may have any desired circuitry capable of performing the functions described herein. The system controller board 24, for example, controls the operation of the processor elements 12 and the analog to digital converters 14. A synchronization pulse signal, such as a 1 pulse per second synchronous pulse, generated by the system clock 32 is provided to the system time board 22. A time of day signal is provided to the system time board 22 via an external time source 40 such as an IRIG B time source.

The time board 22 is constructed so that an interrupt signal is generated whenever a synchronous pulse signal is received by the time board 22. The interrupt signal is transmitted to the system controller board 24. Upon receipt of the interrupt signal, the current processing activities of the system controller board 24 are interrupted and the system controller board 24 reads the time of the interrupt signal from the system time board 22. The system controller 24 also reads the event reports 20, if any, from the individual processor elements 12. If one or more events have occurred, the system controller board 24 determines the absolute time of each event.

The absolute event time, referenced to the external time source for each processor data element, is then determined by the system controller 24. The absolute event time is calculated by determining the offset from the last time read by the system controller board 24 upon receipt of an interrupt from the system time board 22 (the time of the previous interrupt signal). As previously mentioned, each processor element 12 maintains a counter which is incremented every clock period. The event offset time is obtained by determining the number of counts (clock periods) since the previous synchronous pulse and multiplying the number of counts by the period of the system clock. The event offset time thus calculated is then added to the time of the previous interrupt signal to obtain the absolute time of event detection.

An example of this process is shown in FIG. 1. An analog to digital (A/D) converter 14 is attached to each processor element 12. A 118227 Hz sample clock 32 provides a signal to the A/D converter 14. The clock 32 also provides a 1 Pulse Per Second (1 PPS) synchronous pulse signal to the system time board 22. The time board 22 is locked to a time of day input from an external IRIG B time source 40. The 1 PPS synchronous pulse signals the time board 22 to latch the current time and interrupt the system controller board 24. The system controller board 24, upon receipt of the interrupt signal, reads the time of day from the time board 22 and checks for events on each processor element 12. This interrupt and read cycle repeats once per second.

If an event has occurred, the system controller board 24 reads the event report 20. To determine the absolute time of the event, the system controller board 24 calculates the number of counts past the last synchronization pulse. Since the synchronization pulse is produced every 118227 clock pulses, an offset count is given by the count number corresponding to the event expressed modulus 118227. The final time is calculated by adding the offset time to the time obtained from the system time board upon the previous interrupt signal.

The system of the present invention allows many independent processor elements to be synchronized to an external time source. Using the present invention, the system will resychronize at the rate of the synchronization pulse as described above. This allows the system to provide stable time even if the external time source takes large jumps in time forward or backwards. This problem is typical of data analysis systems which record a time reference on magnetic media.

The algorithm of the present invention for calculating event time allows easy development of new algorithms. A common set of time reconstruction software can be developed for the system controller. The developer need not be concerned with absolute time. The only requirement is to maintain a clock counter to which event reports can be referenced.

It is apparent that there has been provided in accordance with the present invention time synchronization algorithm for massively parallel processor systems which fully satisfies the objects, means and advantages set forth hereinbefore. While the invention has been described in combination with specific embodiments thereof, it is evident that many alternatives, modifications, and variations will be apparent to those skilled in the art in light of the forgoing description. Accordingly, it is intended to embrace all such alternatives, modifications, and variations as fall within the spirit and broad scope of the appended claims.

What is claimed is:

1. A time synchronized multi-processor system which comprises:
   means for generating a periodic time signal;
   a plurality of processor elements for processing information about events; each of said processor elements receiving said periodic time signal and a first signal that an event has occurred and thereafter generating an event report containing data about said event and information correlating said event to said periodic time signal;
   means for reading said event reports; and
   means for periodically generating a second signal which causes said reading means to read said event reports and for determining the absolute time of said event.

2. The system according to claim 1 wherein:
   said means for generating said periodic time signal further comprises means for generating a synchronous pulse signal; and
   said means for periodically generating said second signal receives said synchronous pulse signal and generates said second signal upon receipt of each said synchronous pulse signal.

3. The system according to claim 2 wherein said means for periodically generating said second signal also receives a time of day signal.

4. The system of claim 3 wherein said reading means further comprises:
   means for reading the time of day from said second signal generating means after said reading means receives said second signal; and means for determining the absolute time of any event which has occurred prior to receipt of a most recent one of said second signals.

5. The system of claim 2 wherein said means for generating a periodic time signal comprises a system clock having an oscillator which oscillates at a desired period and a divider circuit for generating said synchronous pulse signal at desired intervals.

6. The system of claim 1 further comprising:
   at least one sensor for detecting an event and for generating an analog signal representative of the event;
   at least one analog to digital converter communicating with at least one each processor element; and
   said at least one analog to digital converter converting said analog signal from said at least one sensor into said first signal.

7. The system according to claim 6 further comprising means for maintaining a count of how many time periods after initiation each said first signal is received.

8. The system according to claim 6 wherein said reading means comprises a system controller board for operating said processing elements and each said analog to digital converter.

9. The system according to claim 8 wherein:
   said second signal generating means comprises a system time board; and
   said second signal comprises an interrupt signal for interrupting operation of said system controller board.

10. A method for determining the absolute time when an event occurs in a system having a plurality of processors, said method comprising the steps of:
    providing a plurality of processor elements;
    providing means for generating a time signal having a desired period;
    initializing said processor elements and beginning input of said periodic time signal into each of said processor elements after said initializing step;
    detecting an event and providing at least one processor element with a first signal representative of said event;
    generating an event report with said at least one processor which contains information about said event and a correlation between said event and said periodic time signal; and
    periodically generating a second signal using a time board for causing a system controller board to search for any said event report, to read said event report, and to determine the absolute time of day of any event in said event report.

11. The method according to claim 10 further comprising:
    periodically generating a synchronous pulse signal; and
    said step of generating said second signal comprising providing said periodic synchronous pulse signal to said time board and generating a second signal with said time board every time a synchronous pulse signal is received.

12. The method according to claim 11 further comprising:
    inputting a time of day signal into said time board; and
    reading the time of day with said system controller every time said second signal is generated.

13. The method of claim 12 further comprising:
    generating a first one of said second signals;
    causing said controller board to read the time of day when said first one of said second signals occurred;
    generating a second one of said second signals for causing said controller board to read any said event report;

determining an offset time when any event in said event report occurred by counting the number of time periods since initiation of said system when said event occurred, subtracting the number of time periods at the time of said first one of said second signals, and multiplying the difference by the period of the time signals; and adding said offset time to the time of day of said first one of said signals.

14. The method of claim 13 wherein said first one of said second signals comprises the second signal prior to the one which cause said controller board to read said event report.

* * * * *